US009486008B2

(12) United States Patent
Pryor et al.

(10) Patent No.: US 9,486,008 B2
(45) Date of Patent: Nov. 8, 2016

(54) SYSTEM FOR TOPPING AND TAILING LETTUCE HEADS USING A CAMERA-GUIDED SERVO-CONTROLLED WATER KNIFE

(71) Applicant: Dole Fresh Vegetables, Inc., Westlake Village, CA (US)

(72) Inventors: Rosser W. Pryor, Fayetteville, GA (US); Roland C. Myers, Jr., Senoia, GA (US); Stephan C. Robinson, Carmel, CA (US); Roger D. Billingsley, Laguna Niguel, CA (US); Stephen Chris Jens, Winchester, MA (US); Frank E. Davis, Monterey, CA (US); Robert Ragon, Lake Wylie, SC (US)

(73) Assignee: DOLE FRESH VEGETABLES, INC., Westlake Village, CA (US)

( * ) Notice: Subject to any disclaimer, the term of this patent is extended or adjusted under 35 U.S.C. 154(b) by 629 days.

(21) Appl. No.: 14/040,076

(22) Filed: Sep. 27, 2013

(65) Prior Publication Data

US 2014/0030394 A1    Jan. 30, 2014

Related U.S. Application Data

(62) Division of application No. 12/790,777, filed on May 28, 2010, now Pat. No. 8,549,996.

(51) Int. Cl.
*A23N 15/02* (2006.01)
*A23N 15/04* (2006.01)
(Continued)

(52) U.S. Cl.
CPC .............. *A23N 15/04* (2013.01); *B26D 5/007* (2013.01); *B26F 3/004* (2013.01);
(Continued)

(58) Field of Classification Search
CPC .... A23N 15/003; A23N 15/04; A23N 15/12; B26D 5/007; B26D 7/01; Y10T 83/364; Y10T 83/141; G05B 19/4183; B26F 3/004
USPC .......... 99/635, 643, 636, 639, 546; 426/231, 426/518, 481–485; 83/72, 53, 177, 13, 932, 83/732
See application file for complete search history.

(56) References Cited

U.S. PATENT DOCUMENTS 2,453,040 A    11/1948 Sharma et al.
2,698,804 A    1/1955 Crisafulli et al.
(Continued)

FOREIGN PATENT DOCUMENTS

ES    WO 03047371 A1 *  6/2003  ............ A23N 15/00
FR    2305137 A1    10/1976
(Continued)

OTHER PUBLICATIONS

Notice of Allowance received for U.S. Appl. No. 12/501,791, mailed on Mar. 19, 2010, 10 pages.
(Continued)

*Primary Examiner* — Dana Ross
*Assistant Examiner* — Hemant Mathew
(74) *Attorney, Agent, or Firm* — Morrison and Foerster, LLP (57) ABSTRACT

A system for trimming a lettuce head using a digital imaging system and cutting mechanism. The lettuce head is conveyed between a lower feed conveyor and an upper feed conveyor that is disposed a fixed distance over and substantially aligned with a lower feed conveyor. The digital imaging system is configured to capture an image of the lettuce head and determine a cutting profile using the image. The cutting mechanism is disposed over the lower feed conveyor and includes: a servo motor mechanically coupled to a drive shaft; an armature with a pivot end mounted to the drive shaft and a sweep end disposed a radial distance from the pivot end; a cutting nozzle, mounted to the sweep end of the armature, configured to trim the lettuce head; and servo-control circuitry configured to articulate the cutting nozzle through a cutting arc based on the cutting profile.

8 Claims, 6 Drawing Sheets

(51) Int. Cl.
| | |
|---|---|
| *A47J 21/00* | (2006.01) |
| *B26F 3/00* | (2006.01) |
| *B26D 5/00* | (2006.01) |
| *G05B 19/418* | (2006.01) |
| *A23N 15/12* | (2006.01) |
| *B26D 7/01* | (2006.01) |
| *A23N 15/00* | (2006.01) |

(52) U.S. Cl.
CPC ........ *G05B 19/4183* (2013.01); *A23N 15/003* (2013.01); *A23N 15/12* (2013.01); *B26D 7/01* (2013.01); *Y10T 83/141* (2015.04); *Y10T 83/364* (2015.04)

(56) References Cited

U.S. PATENT DOCUMENTS

| | | |
|---|---|---|
| 3,391,718 A | 7/1968 | Cooke et al. |
| 3,587,203 A | 6/1971 | Miles |
| 3,652,300 A | 3/1972 | Sharma |
| 3,768,101 A | 10/1973 | Kuts |
| 3,807,657 A | 4/1974 | Brill |
| 3,814,820 A | 6/1974 | Busta et al. |
| 3,949,630 A | 4/1976 | Winkel |
| 4,001,443 A | 1/1977 | Dave |
| 4,036,123 A | 7/1977 | Conkey |
| 4,520,702 A | 6/1985 | Davis et al. |
| 4,552,526 A | 11/1985 | Hafele |
| 4,711,789 A | 12/1987 | Orr et al. |
| 4,753,808 A | 6/1988 | Orr et al. |
| 4,846,914 A | 7/1989 | Woodrich |
| 4,949,612 A | 8/1990 | Julian |
| 4,970,757 A | 11/1990 | Heiland et al. |
| 5,074,039 A | 12/1991 | Hillbish et al. |
| 5,126,153 A | 6/1992 | Beck |
| 5,133,687 A * | 7/1992 | Malloy ................ A22B 5/0029 452/149 |
| 5,146,734 A | 9/1992 | Smyczek |
| 5,215,496 A | 6/1993 | Heiland et al. |
| 5,249,492 A | 10/1993 | Brown et al. |
| 5,316,778 A | 5/1994 | Houghham |
| RE34,678 E | 8/1994 | Fischer et al. |
| 5,352,153 A | 10/1994 | Burch et al. |
| 5,363,634 A * | 11/1994 | Saito ...................... A01D 23/04 171/17 |
| 5,367,929 A | 11/1994 | Burch et al. |
| 5,528,967 A | 6/1996 | Maroney |
| 5,549,521 A | 8/1996 | van den Nieuwelaar et al. |
| 5,558,666 A | 9/1996 | Dewey et al. |
| 5,560,190 A | 10/1996 | Ottaway |
| 5,752,949 A | 5/1998 | Tankovich et al. |
| 5,776,175 A | 7/1998 | Eckhouse et al. |
| 5,783,229 A | 7/1998 | Manlove |
| 5,795,535 A | 8/1998 | Giovannone et al. |
| 5,916,354 A | 6/1999 | Dragt |
| 5,925,395 A | 7/1999 | Chen |
| 6,033,171 A | 3/2000 | Doyle et al. |
| 6,050,073 A | 4/2000 | Nevarez, Sr. |
| 6,054,160 A | 4/2000 | Gwad et al. |
| 6,086,800 A | 7/2000 | Manlove |
| 6,112,429 A | 9/2000 | Mitchell et al. |
| 6,113,958 A | 9/2000 | Saltveit et al. |
| 6,123,970 A | 9/2000 | Dull |
| 6,149,644 A | 11/2000 | Xie |
| 6,152,282 A | 11/2000 | Ewan et al. |
| 6,273,883 B1 | 8/2001 | Furumoto |
| 6,308,600 B1 | 10/2001 | Dragt |
| 6,413,556 B1 | 7/2002 | Bathurst et al. |
| 6,467,248 B2 | 10/2002 | Brown |
| 6,484,810 B1 * | 11/2002 | Bendix .................. A01D 23/04 171/11 |
| 6,563,904 B2 | 5/2003 | Wijts et al. |
| 6,655,248 B1 * | 12/2003 | Johnson ................ B26D 1/553 225/103 |
| 6,729,218 B2 | 5/2004 | Somsen |
| 6,763,752 B2 | 7/2004 | Marshall et al. |
| 6,843,049 B2 | 1/2005 | Brown |
| 7,052,388 B2 | 5/2006 | Houtz |
| 7,062,899 B2 | 6/2006 | Maconachy et al. |
| 7,433,059 B2 * | 10/2008 | van der Knijff ....... A23N 15/08 356/601 |
| 7,448,094 B2 * | 11/2008 | Lachance ........... A22C 17/0006 83/177 |
| 7,559,275 B1 | 7/2009 | Patil et al. |
| 2002/0164407 A1 | 11/2002 | Wolfe et al. |
| 2002/0185284 A1 * | 12/2002 | Bendix .................. A01D 23/04 171/10 |
| 2003/0036749 A1 | 2/2003 | Durkin et al. |
| 2003/0056627 A1 * | 3/2003 | Hubert ................ A23N 15/003 83/13 |
| 2003/0145699 A1 * | 8/2003 | Kim ........................ B26D 3/10 83/13 |
| 2003/0177879 A1 * | 9/2003 | Abarzuza ............... A23N 15/12 83/53 |
| 2004/0010300 A1 | 1/2004 | Masotti et al. |
| 2004/0149545 A1 | 8/2004 | Tarantino et al. |
| 2004/0187465 A1 | 9/2004 | Tarantino et al. |
| 2008/0276777 A1 | 11/2008 | Blaine et al. |
| 2009/0217793 A1 | 9/2009 | Spillner et al. |
| 2009/0274809 A1 | 11/2009 | Patil et al. |

FOREIGN PATENT DOCUMENTS

| | | |
|---|---|---|
| JP | 8336795 A | 12/1996 |
| JP | 2733756 B2 | 3/1998 |
| WO | 03/047371 A1 | 6/2003 |

OTHER PUBLICATIONS

Final Office Action received for U.S. Appl. No. 12/841,954, mailed on Mar. 28, 2012, 8 pages.
Non Final Office Action received for U.S. Appl. No. 12/841,954, mailed on Dec. 21, 2011, 8 pages.
Notice of Allowance received for U.S. Appl. No. 12/841,954, mailed on Aug. 2, 2012, 22 pages.
Office Action received for Canadian Patent Application No. 2,547,875, mailed on Apr. 16, 2012, 3 pages.
Thomasnet News, "Defect Removal System Targets Potato Processing Industry", Apr. 4, 2006, 10 pages.
Office Action received for Canadian Patent Application No. 2,547,875, mailed on Jan. 25, 2013, 4 pages
Non Final Office Action received for U.S. Appl. No. 12/790,777, mailed on Oct. 9, 2012, 9 pages.
Notice of Allowance received for U.S. Appl. No. 12/790,777, mailed on Jun. 6, 2013, 12 pages.

* cited by examiner

SYSTEM FOR TOPPING AND TAILING LETTUCE HEADS USING A CAMERA-GUIDED SERVO-CONTROLLED WATER KNIFE

CROSS-REFERENCE TO RELATED APPLICATIONS

This application is a divisional of U.S. application Ser. No. 12/790,777 filed May 28, 2010.

BACKGROUND

1. Field

This application relates generally to a system for trimming leafy vegetables of varying size and shape and, more specifically, to an image-guided, servo-controlled water knife that tops and tails romaine lettuce heads.

2. Description of the Related Art

In commercial harvesting operations, leafy vegetables (e.g., heads of romaine lettuce) are cut from a plant root and are processed to remove undesirable portions of the vegetable. Commercially harvested heads of romaine lettuce have a tail or core end that includes the lettuce stem where the head was previously attached to the plant root. The lettuce head also has a top or leafy end opposite the core end. Lettuce heads are typically trimmed manually to remove portions of the top and tail of the lettuce head. A worker manually removes the core using a knife or hand tool. The worker also trims the tips of the leaves from the top end of the head that may have been damaged by the sun or the harvesting process.

This manual trimming process, sometimes called topping and tailing, can be performed in the field immediately after harvesting. A trained worker can top and tail each head of lettuce so that only the undesirable portions are removed, minimizing wasted product. However, manual topping and tailing is time consuming and may be performed outdoors where the worker is subjected to sun and heat. Additionally, cut portions of the lettuce head may discolor or brown if the juices of the plant are not immediately rinsed after cutting with a knife.

Some commercial harvesting operations have automated the topping and tailing process using two or more cutting blades spaced a fixed distance apart. In such systems, mechanically-actuated blades slice the top and tail end of the romaine lettuce as the vegetables are conveyed through the machine. In some cases, a fixed-blade system may be faster than manual trimming. However, the size and shape of each lettuce head varies and fixed-blade systems lack the flexibility to trim each head so as to minimize wasted product. In order to process a variety of head sizes, the blades may be set at a narrow spacing so that the smallest anticipated head size is trimmed by both cutting blades. However, when larger lettuce heads are processed using the narrow blade spacing, a significant amount of usable vegetable is removed, wasting usable lettuce product. Additionally, some systems may waste product by making cuts that are unable to conform to the rounded contour of a lettuce head. For example, in some systems a blade may be set to remove the tips of shorter, outer leaves, but will also remove usable portions of the longer, inner lettuce leaves.

In some aspects of the system, the lower feed conveyor is configured to convey the lettuce head under the tail-cutting mechanism as the second cutting nozzle is articulated through the tail-cutting arc to produce a v-notch cut in the tail end of the lettuce head.

SUMMARY

A system for trimming a whole lettuce head having a top end and a tail end. The system comprises a lower feed conveyor, an upper feed conveyor, a digital imaging system, and a top-cutting mechanism. The lower feed conveyer has an input end and an output end and is configured to convey the lettuce head. The upper feed conveyor is disposed a fixed distance over and substantially aligned with the lower feed conveyor to convey the lettuce head disposed between the lower and upper feed conveyors. The digital imaging system is disposed over the lower feed conveyor a fixed distance from the input end of the lower feed conveyor. The digital imaging system is configured to capture an image of the lettuce head and determine a top-cutting profile using the image. The top-cutting mechanism is disposed over the lower feed conveyor between the digital imaging system and the output end of the lower feed conveyor. The top-cutting mechanism comprises: a first servo motor mechanically coupled to a first drive shaft; a first armature with a pivot end and a sweep end, wherein the sweep end is disposed a radial distance from the pivot end, and wherein the pivot end is mounted to the first drive shaft; a first cutting nozzle configured to trim the lettuce head, wherein the first cutting nozzle is mounted to the sweep end of the first armature; and servo-control circuitry configured to articulate the first cutting nozzle through a top-cutting arc based on the top-cutting profile.

In some aspects of the system, the lower feed conveyor is configured to convey the lettuce head under the top-cutting mechanism as the first cutting nozzle is articulated through the top-cutting arc to produce a variable-radius cut across the top end of the lettuce head. In some aspects of the system, the variable-radius cut corresponds to the top-cutting profile. In some aspects, the digital imaging system determines the top-cutting profile by determining a top-edge profile of the top end of the lettuce head and determining an offset from the top-edge profile.

In some aspects of the system, the digital imaging system is configured to determine a tail-cutting profile using the image. The system may also include a tail-cutting mechanism disposed over the lower feed conveyor and near the top-cutting mechanism. The tail-cutting mechanism comprising: a second servo motor mechanically coupled to a second drive shaft; a second armature with a pivot end and a sweep end, wherein the sweep end is disposed a radial distance from the pivot end, and wherein the pivot end is mounted to the second drive shaft; and a second cutting nozzle to cut the lettuce head, wherein the second cutting nozzle is mounted to the sweep end of the second armature, wherein the servo-control circuitry is configured to articulate the second cutting nozzle through a tail-cutting arc based on the tail-cutting profile.

The figures depict one embodiment of the present invention for purposes of illustration only. One skilled in the art will readily recognize from the following discussion that alternative embodiments of the structures and methods illustrated herein can be employed without departing from the principles of the invention described herein.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

The following embodiments are directed to a system for trimming leafy vegetables having a core and a leafy end, after the vegetable is harvested. The system uses a variable position cutter to trim a top portion from the leafy end and a tail portion from the core end of the leafy vegetable. In general, the system captures an image of each leafy vegetable using a digital imaging camera. The system determines a cutting profile for the top portion and the tail portion of the leafy vegetable based on the captured image. A cutting mechanism with an articulated armature performs either a topping or tailing cut to trim a portion of the leafy vegetable based on the respective cutting profile. Because the cutting profile is based on an image of each vegetable being processed, the profile can be optimized to account for variations in overall vegetable size, reducing unnecessary waste. Additionally, the shape of the cut can be adapted to account for variations in vegetable shape. The cutting mechanism is capable of creating a variable-radius arc cutting path through the leafy vegetable by sweeping a fixed-radius armature through a cutting arc while the leafy vegetable is being conveyed past the cutting mechanism.

1. System Overview

Figure 1A:
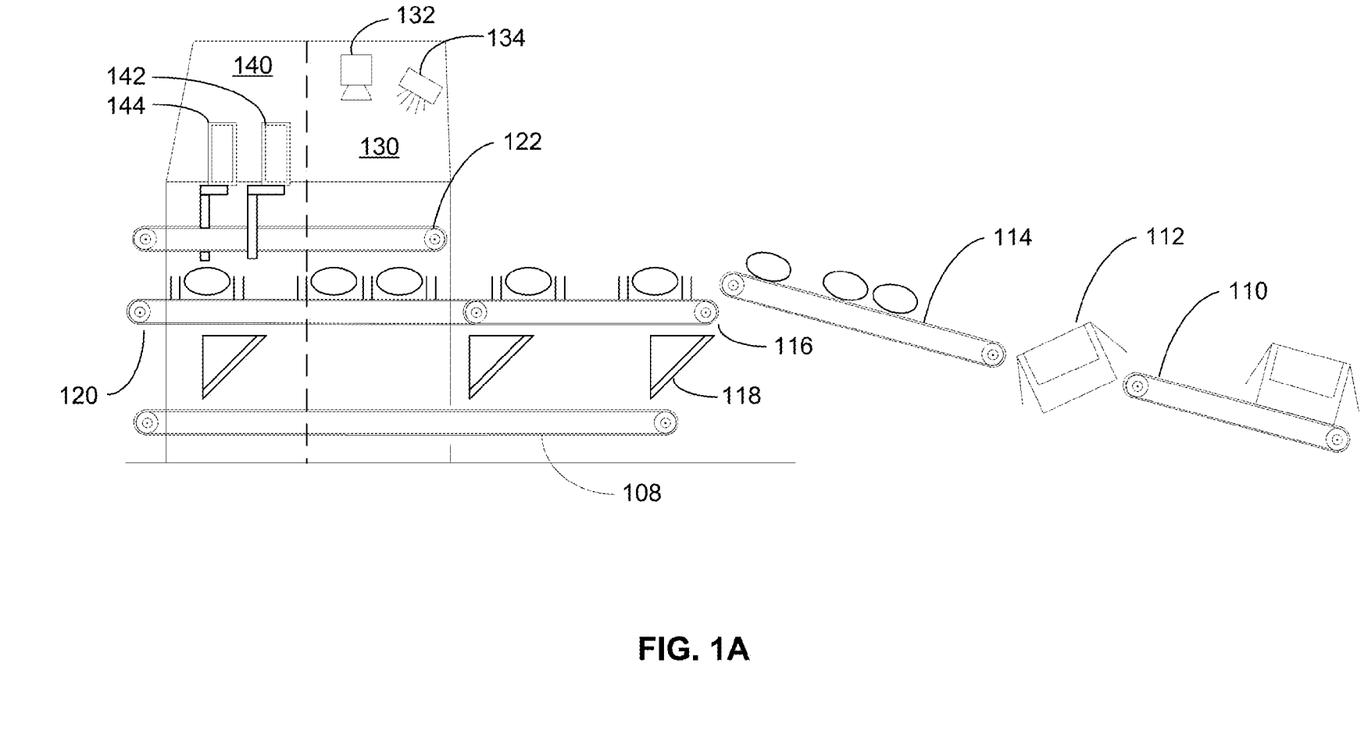
FIG. 1A depicts an elevation view of a camera-guided vegetable trimmer.
Figure 1B:
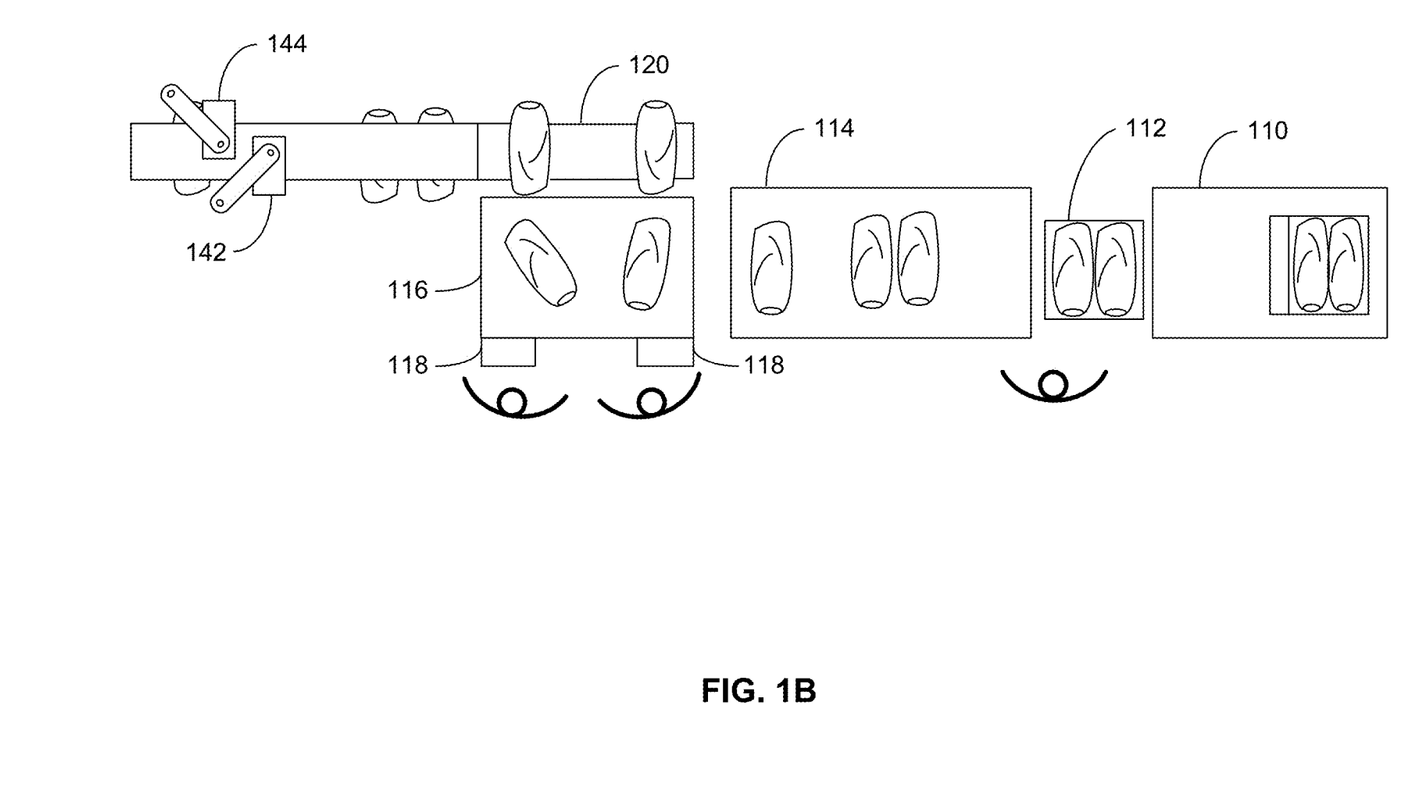
FIG. 1B depicts a plan view of a camera-guided vegetable trimmer.

FIGS. 1A and 1B depict an exemplary system for processing leafy vegetables. In this exemplary embodiment, boxes of leafy vegetables are delivered to a processing plant from a storage area or directly from a harvesting location. The boxed leafy vegetables may be, for example, untrimmed, whole heads of romaine lettuce.

The system depicted in FIGS. 1A and 1B uses a series of inclined and staging conveyors that allow workers to unload and stage leafy vegetables for processing by the system. FIG. 1A depicts a simplified elevation view of the system and FIG. 1B depicts a simplified plan view.

Full boxes of leafy vegetables are loaded onto the lower end of a box incline conveyer 110. The lower end of the box incline conveyer 110 is approximately 20 inches from the ground, allowing a worker to place boxes on the conveyor in an ergonomically efficient manner. The full boxes are conveyed up the box incline conveyor 110 to a box unloading station 112. The angle of the box incline conveyor 110 is determined, in part, by the height of the box unloading station 112, which, in this embodiment, is approximately 30 inches from the ground. The incline angle of incline box conveyor 110 should be steep enough to minimize floor space but also be gentle enough to prevent the boxes from sliding back down the incline box conveyor belt due to gravity.

A worker at the box unloading station 112 removes the leafy vegetables and orients them as they are placed onto an incline transfer conveyor 114. The main function of the incline transfer conveyor 114 is to elevate and transport the leafy vegetables to a staging conveyor 116, which is set at a height roughly equal to the lower feed conveyor 120, as shown in FIG. 1A. The spacing and orientation of the leafy vegetables placed on the incline transfer conveyor 114 sets the pace of production and enables workers at the staging conveyor 116 to maintain an efficient production rate. The top of the incline transfer conveyor 114 vertically overlaps the staging conveyor 116 by a short distance allowing the leafy vegetables to transfer between the two conveyors. In some instances, a worker manually assists the transfer of the leafy vegetables from the incline transfer conveyor 114 to the staging conveyor 116.

One or more workers adjacent to the staging conveyor 116 manually remove stray leaves and inspect the leafy vegetables for defects. Waste chutes 118 are located adjacent to the staging conveyor 116 and allow the workers to remove unwanted material from the work area without undue reaching or twisting. Material placed in waste chutes 118 is deposited onto waste output conveyor 108 and conveyed out of the system.

The lower feed conveyor 120 runs parallel to the staging conveyor 116 along a side opposite to where the workers stand. Workers adjacent to the staging conveyor 116 orient the leafy vegetables between conveyor flights of the lower feed conveyor 120. In some instances, the leafy vegetables are oriented with the core end toward one edge of the lower feed conveyor 120 and justified against a guide rail or aligned with a visual indicator. The leafy vegetables may also be oriented between the flights so that the flatter portion of the vegetable is belt-side-down. In this way, the leafy vegetables may "fan out" as they lie on the lower feed conveyor 120.

The lower feed conveyor 120 transports the leafy vegetables downstream through an imaging station 130 and cutting station 140 as shown in FIG. 1A. As the leafy vegetables are transported, it is important that their orientation and placement on the conveyor belt remains consistent. In the present embodiment, each leafy vegetable is constrained on four sides of the leafy vegetable—the underside, two lateral sides and the topside. The underside of the leafy vegetable is supported and constrained by the conveyor belt of the lower feed conveyor. The two lateral sides of the leafy vegetable are constrained by a pair of flights attached to the belt of the lower feed conveyor. Last, the top side of the leafy vegetable is constrained by the conveyor belt of a second, upper feed conveyor 122 that is positioned above the lower feed conveyor 120.

The flights attached to the belt of the lower feed conveyor help push the leafy vegetables through the system and help maintain the vegetable's placement on the conveyor belt as it is being transported. Typically, pairs of conveyor flights are spaced at a width slightly larger than the largest expected leafy vegetable. In some instances, there is a short gap between pairs of flights so that the leafy vegetables are spaced apart when placed in adjacent pairs of flights on the lower feed conveyor 120. The width of the lower feed conveyor belt is narrower than the length of a typical leafy vegetable so that the ends of the leafy vegetable can be trimmed in the cutting station without cutting or damaging the conveyor belt.

As mentioned above, the leafy vegetables are also constrained by the conveyor belt of a second, upper feed conveyor 122 that is positioned a few inches above the lower feed conveyor 120 and is oriented so that the two conveyors are substantially aligned. The height of the upper feed conveyor 122 may be adjusted based on the thickness of the leafy vegetables being processed. The upper feed conveyor 122 applies a light downward pressure to the leafy vegetables so that the vegetables remain in substantially the same orientation with respect to the belt of the lower feed conveyor as they are conveyed through the imaging station 130 and cutting station 140. The upper feed conveyor 122 may also be used to slightly flatten the leafy vegetable so that the outer leaves are fanned out from the body of the vegetable. The belt of the upper feed conveyor is narrower than the length of a typical leafy vegetable so that the camera 132 can view a portion of each end of the leafy vegetable from above. A narrower belt also allows the cutting station 140 to trim the ends of the leafy vegetable without cutting or damaging the conveyor belt.

The upper feed conveyor 122 and the lower feed conveyor 120 are mechanically or electronically coupled so that the speeds of both conveyors are synchronized. Preferably, the conveyors are electronically controlled so that they can be started and stopped in a predicable manner based on sensor feedback from the system.

In general, FIGS. 1A and 1B depict one exemplary embodiment. However, a different number of conveyors may be used to accomplish functions of the system depicted in FIGS. 1A and 1B. For example, the incline transfer conveyor 114, staging conveyor 116, and lower feed conveyor 120 may all be the same conveyor. Alternatively, the function of each conveyor described above could be performed by multiple conveyors arranged end-to-end.

Figure 3:
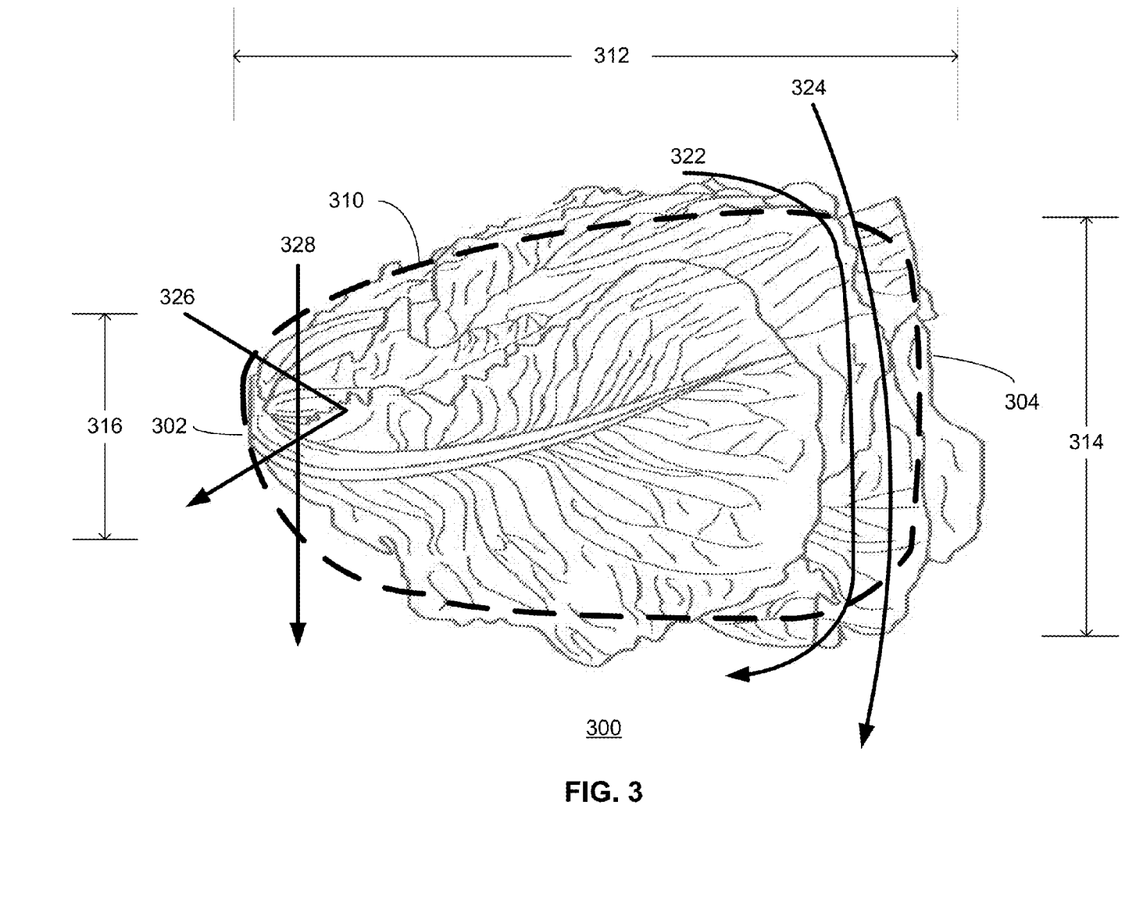
FIG. 3 depicts an exemplary image of a leafy vegetable.

FIG. 1A also depicts a schematic representation of an imaging station 130 with an imaging camera 132 used to capture an image of each leafy vegetable that is processed by the system. The imaging camera 132 includes one or more optical elements capable of collecting and focusing light onto the camera's imaging sensor (e.g., a two-dimensional charge-coupled device (CCD) sensor array). The imaging camera 132 may be in electrical communication with a computer processor and computer memory used to store an image of the leafy vegetable acquired from the imaging sensor. The camera 132 may be used to store image data acquired from the imaging sensor as a .jpg, .tiff, or other image file format. FIG. 3, described in more detail below, depicts an exemplary image 300 produced by imaging camera 132.

The imaging camera 132 is positioned above the upper feed conveyor 122 at a sufficient height to allow the imaging camera 132 to capture an image of at least a portion of a leafy vegetable positioned on the lower feed conveyor 120. In the present embodiment, the imaging camera 132 has a field-of-view sufficiently wide to capture an image of an entire leafy vegetable.

The imaging station 130 includes elements that improve the visibility of leafy vegetables being transported through the system. An illuminating light source 134 provides additional light for enhancing the contrast and detail of a leafy vegetable being imaged by the system. The illuminating light source 134 may pulse the light output (e.g., strobe) to produce a momentary illumination synchronized with the presence of a leafy vegetable within the camera's field-of-view. In some cases, a position sensor detects a flight on the lower feed conveyor 120, triggering a light pulse. A background plate may also be placed under the lower feed conveyor belt within the camera's field-of-view. The color of the background plate is selected so as to enhance the visibility of the outside edges of a leafy vegetable being imaged.

The exemplary schematic in FIG. 1A depicts a single camera and a single light source. Additional ambient light sources or directional light sources may be used to enhance the illumination of a leafy vegetable. Additionally, more than one camera may be used to capture more than one image of a leafy vegetable.

The system analyzes each image to determine the cutting profiles to remove a top portion and tail portion of the leafy vegetable that was imaged. For example, analysis may determine an edge representing the outer profile shape of the leafy end of a vegetable. The shape and location of the outer profile edge may be used to determine a top-cutting profile. Analysis determining variations in color or shape of the leafy end of the vegetable may also be used to determine the top-cutting profile. Analysis may also determine an edge representing the location of the core end of the leafy vegetable, which is used to determine a tail cutting profile. The top and tail cutting profiles are associated with each vegetable to be trimmed and stored, at least temporarily, in the system memory.

Downstream of the imaging station 130 is the cutting station 140 where the top portion and tail portion of a leafy vegetable are removed using a top and tail cutting mechanism 142 and 144, respectively. Each cutting mechanism includes an armature for sweeping a cutting nozzle through an arc. The cutting nozzle produces a jet of fluid capable of cutting the leafy vegetable. The fluid used for cutting can be any one of a number of fluids suitable for forming a jet. The cutting nozzle and stream of fluid are referred to herein generally as a "water knife." A more detailed description of a cutting mechanism is described below with respect to FIG. 4.

Each cutting mechanism is capable of producing a variable-radius arc cutting path as the leafy vegetables are conveyed through the cutting station 140 by the upper and lower feed conveyers (122 and 120). The system detects the position of a leafy vegetable to be trimmed using, for example, one or more position sensors designed to detect the location of a flight of the lower feed conveyor belt. Alternatively or additionally, the position of the leafy vegetable is estimated by determining the distance the conveyor has moved since the image of the leafy vegetable was captured in the imaging station 130. For example, the system may acquire and store the movement of a conveyor pulley used to drive the lower feed conveyor 120.

Based on the estimated position of the leafy vegetable to be trimmed, each cutting mechanism (142, 144) sweeps a water jet through an arc based on the cutting profile previously determined and associated with the leafy vegetable. The coordinated movement of the vegetable being conveyed on the conveyor and water jet being swept through an arc can produce a variable-radius arc cut across the top end of the leafy vegetable being trimmed.

In some cases, a cutting mechanism is used to produce a cutting path that is not a variable-radius arc. For example, the tail-cutting mechanism 144 may produce a straight cut across the core end of the leafy vegetable being trimmed. Also, the top-cutting mechanism 142 may produce a single-radius arc cut across the leafy end of the vegetable being trimmed.

Figure 2:
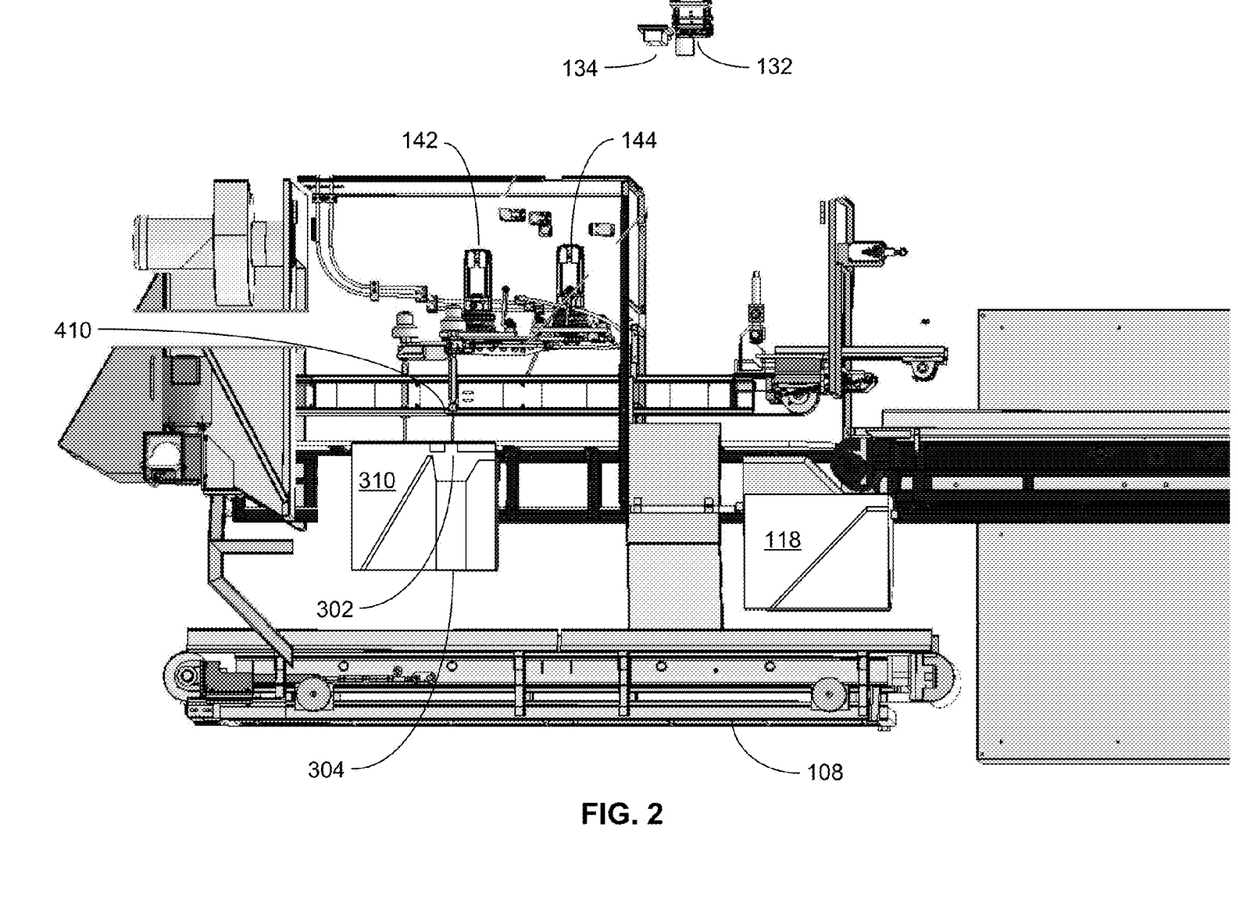
FIG. 2 depicts an exemplary imaging station and trimming station.

FIG. 2 depicts an imaging station 130 and cutting station 140 of an exemplary system with portions of the frame removed for ease of illustration. In the present embodiment, water knife 410 directs the stream of fluid downward through a slot 302 in the bed of the lower feed conveyor 120. As mentioned above, the widths of the conveyor belts for both the upper and lower feed conveyors are narrow enough to allow the water knife to swing through a trimming arc without damaging the conveyor belt. The fluid used to cut the leafy vegetables is collected in a catch drain 304 below the bed of the lower feed conveyor. The slot 302 in the conveyor bed reduces back spray as the fluid jet is collected.

Adjacent to the catch drain, a pair of chutes 310 collects the vegetable trimmings as they are removed during the topping and tailing process. In one example, a hole or gap in the conveyor bed of the lower feed conveyor 120 allows the trimmings to fall into chutes 310 as the water knife 410 removes the material from the leafy vegetable. The chute configuration depicted in FIG. 2 provides a simple and reliable method of separating the vegetable trimmings from the processed vegetable product. As described above, a waste output conveyor 108 conveys the trimmings out of the system.

As shown in FIGS. 1A and 1B, the lower feed conveyor 120 transports trimmed leafy vegetables out of the system. In some instances, the lower feed conveyor 120 interfaces with one or more other conveyors to transport the trimmed vegetables to other areas for further processing. In some cases, the lower feed conveyor 120 is used to collect the trimmed vegetables in a temporary storage container or bin.

2. Camera Imaging

FIG. 3 depicts an exemplary image of a leafy vegetable captured using an imaging camera 132. As described above, a leafy vegetable has a core end 302 and a leafy end 304 as shown in the image of the leafy vegetable in FIG. 3. The system uses the camera 132 to identify a top portion to be removed from the leafy end 304 and a tail portion to be removed from the core end 302.

When a leafy vegetable is positioned within the camera's field of view, the system triggers an image capture event. In one example, a sensor is used to detect the presence of the leafy vegetable below the camera 132. Additionally or alternatively, a sensor may be used to detect the location of a flight of the input feed conveyor belt 120, indicating that a pair of flights is positioned below the camera 132. The system may check for the presence of a leafy vegetable every time a pair of flights is positioned or centered below the camera 132. In yet another example, the camera detects the presence of a leafy vegetable using data received from the camera's image sensor. That is, a signal from the imaging sensor can be monitored for a signal change indicating a darkened object (e.g., a leafy vegetable) is within the camera's field-of-view.

During an image capture event, data from the camera's imaging sensor (e.g., a CCD sensor array) is acquired and stored as an image file in accordance with an image file format (e.g., .jpg, .tiff, or .rgb image formats). Alternatively, the data from the imaging sensor may be stored temporarily as a data array or software data object without creating an image file. Data that has been acquired from the camera's image sensor during an image capture event and stored in system memory (even if temporarily) is herein referred to as a captured image.

In some cases one or more light sources are used to illuminate a leafy vegetable while the data from camera's imaging sensor is being acquired. In some cases, the one or more light sources produce a pulse or strobe of light during the image capture event. The pulsed light allows the camera sensor to collect light momentarily reflected off a leafy vegetable while the lower feed conveyor 120 is still moving. In this way, the lower feed conveyor 120 does not need to be stopped during the image capture event.

The system analyzes the captured image of the leafy vegetable to determine one or more vegetable-specific parameters. As shown in FIG. 3, the captured image may be analyzed to determine a profile outline 310, an overall length 312, or one or more widths 314, 316 of the leafy vegetable. These vegetable-specific parameters account for variations in size or shape of the vegetables being processed.

The vegetable-specific parameters are used to determine a top-cutting profile (e.g., 322, 324) and a tail-cutting profile (e.g., 326, 328) for a vegetable associated with the captured image. The cutting profiles may be stored as a set of coordinates, a vector array, parametric spline, or other method of representing two-dimensional geometry. The cutting profiles are associated with an offset distance representing the position of the cutting profiles with respect to a physical object reference in the system, such as the edge of a conveyor flight.

An exemplary top-cutting profile 322 is based on vegetable-specific parameters representing properties of the leafy end of the vegetable. For example, the location of the top-cutting profile 322 may be determined based on a parameter representing the portion of the profile outline 310 at the leafy end of the vegetable. The length of the top-cutting profile 322 may be based on a parameter representing a width 314 at the leafy end of the vegetable. The shape of the top-cutting profile 322 may be determined using a vegetable-specific parameter representing the shape of the leafy vegetable at the leafy end.

Another exemplary top-cutting profile 324 is also based on vegetable-specific parameters representing properties of the leafy end of the vegetable. The location and length of the top-cutting profile 324 may be dependent on vegetable-specific parameters, while the shape of the top-cutting profile 324 is a constant radius arc. For example, location of the top-cutting profile 324 may vary according to location of the leafy end of the vegetable, while the shape of top-cutting profile 324 remains the same.

Similarly, the tail-cutting profile 328 is based on vegetable-specific parameters representing properties of the core end of the vegetable. For example, the location of the tail-cutting profile 328 may be determined using a fixed offset from a parameter representing the portion of the profile outline 310 at the core end of the vegetable. The length of the tail-cutting profile 328 may be based on a parameter representing a width at the core end of the vegetable. In this example, the shape of the tail-cutting profile 328 is a straight line.

Alternatively, a tail-cutting profile 326 may have a standard shape to produce trimmed vegetables with a uniform cut across the core end of the vegetable. In this example, the tail-cutting profile 326 produces a v-cut in the core end of the vegetable. The shape of a tail-cutting profile may also be determined using a vegetable-specific parameter similar to the method described for the top-cutting profile.

3. Exemplary Servo-Controlled Cutting Mechanism

Figure 4:
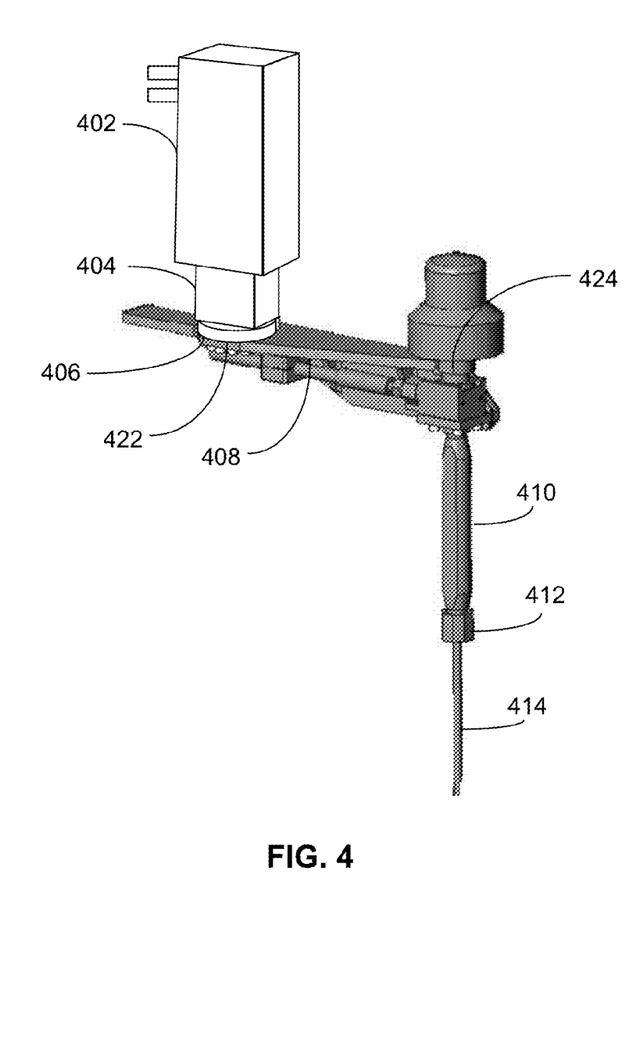
FIG. 4 depicts a cutting mechanism including an exemplary cutting armature.

FIG. 4 depicts an exemplary servo-controlled cutting mechanism with a water-knife. As shown in FIGS. 1A and 1B, a typical system has separate cutting mechanisms for trimming the top portion and the tail portion of a leafy vegetable, respectively. Each cutting mechanism is mounted to the frame within the cutting station portion of the system.

Servo motor 402 is used to drive the mechanism via a servo-motor output shaft. In some instances, the servo motor 402 is a brushless AC motor with an array of feedback sensors in the form of a brushless resolver. The feedback sensors detect the speed and angle position of the servo-motor output shaft and provide a feedback signal to the servo-motor control electronics.

The servo-motor output shaft is coupled to a gearbox unit 404 to reduce the turn ratio output of the servo-motor output shaft. In the present embodiment, the gearbox unit 404 includes a planetary gear set to provide a fixed-gear reduction ratio. FIG. 4 depicts a parallel shaft gearbox unit 404, but other configurations, such as a 90-degree gearbox, could also be used. The gearbox unit 404 has a gearbox output shaft that is coupled to a pivot end 422 of the cutting armature 408. In FIG. 4, the gearbox output shaft is coupled to an adaptor plate 406 that is used to mount the cutting armature 408.

The gearbox unit 404 serves two purposes. First, the gearbox unit 404 increases the positioning accuracy of the cutting armature 408. By way of example, the resolver of the servo motor 402 may be capable of positioning the servo-motor output shaft to +/−0.5 degree accuracy. If the gearbox unit 404 has a 10:1 gear reduction ratio, the effective positioning accuracy of the cutting armature 408 is +/−0.05 degrees. Second, the gearbox unit 404 reduces the effective inertial mass of the cutting armature 408 for purposes of servo positioning control. In general, a larger gear reduction results in a lower effective inertial mass improving servo positioning control response and control stability.

As described above, the pivot end 422 of the cutting armature 408 is coupled to the gearbox output shaft via an adaptor plate 406. A water knife 410 is mounted to the sweep end 424 of the cutting armature 408, a radial distance from the pivot end 422. The water knife 410 is directed downward toward the leafy vegetable positioned on the lower feed conveyor 120.

In the present embodiment, the water knife 410 includes a pressurized fluid input, a fluid intensifier, and a cutting nozzle 412 The fluid intensifier boosts the pressurized fluid input to a high pressure, which may be in excess of 30,000 PSI. The high-pressure fluid is fed through the cutting nozzle 412, which produces a jet of fluid 414 capable of cutting a leafy vegetable. The system operates one or more valves in line with the pressurized fluid input to control the operation of the water knife 410.

Servo-control circuitry drives the servo motor 402 using a feedback signal from the servo resolver to articulate the cutting armature 408 and water knife 410 through an arc sweep. The servo-control circuitry is capable of controlling the position, velocity, and acceleration of the water-knife arc sweep. In the present embodiment, the servo-control circuitry produce an arc sweep of the water knife that is coordinated with the movement of the lower and upper feed conveyors 120, 122 so as to produce a variable-radius cutting path through a leafy vegetable that is being trimmed. The cutting path corresponds to either a top or tail cutting profile that was associated with the leafy vegetable at the imaging station 130.

In the present embodiment, the servo-control circuitry includes a computer processor, computer memory, and servo-drive electronics. The computer processor and computer memory may be part of a centralized computer system that is used to control other aspects of the system. In some instances, the computer processor and computer memory are part of a programmable logic controller (PLC) that operates the electrical components in the system. The servo-drive electronics may be, for example, a servo drive amplifier capable of receiving positioning input and producing an electrical output for driving the servo motor 402 and water knife 410 through an appropriate arc. In some embodiments, the servo-control circuitry is a modular unit capable of receiving cutting profile information from the digital imaging station and producing an electrical output for driving the servo motor 402 and water knife 410 through an appropriate arc.

4. Topping and Tailing a Romaine Head Using a Camera-Guided System

Figure 5:
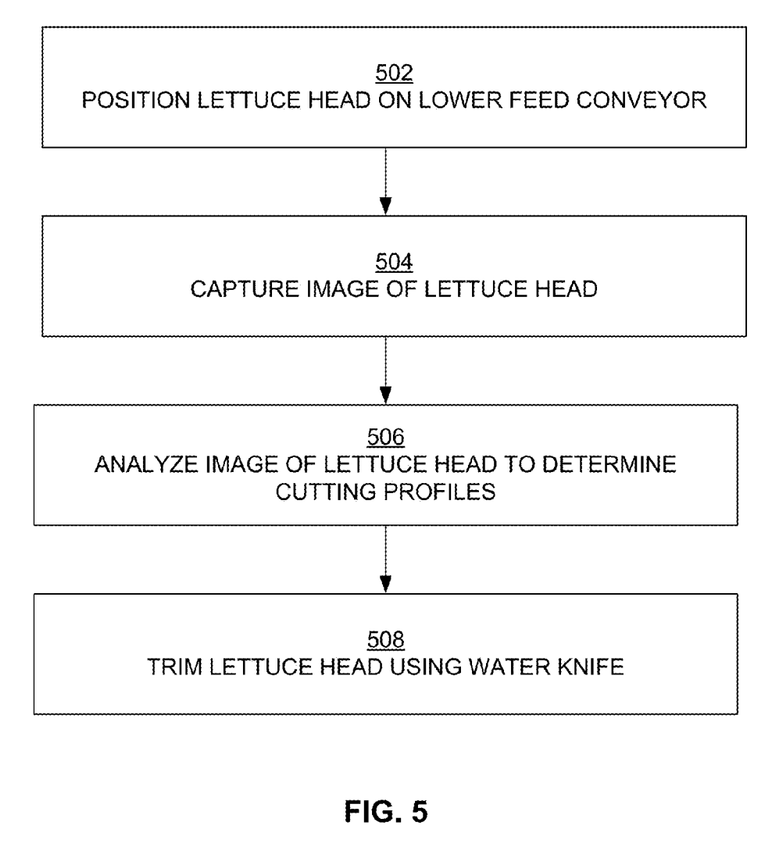
FIG. 5 depicts an exemplary process for topping and tailing a lettuce head.

The following is an exemplary process for trimming the leafy end and core end of a leafy vegetable, otherwise known as topping and tailing. In this example, the leafy vegetable is whole head of romaine lettuce. FIG. 5 depicts a flow chart of an exemplary sequence in a topping and tailing process.

In step 502, the lettuce head is placed on a lower feed conveyor between a pair flights on the lower feed conveyor belt. An upper feed conveyor above and substantially aligned with the lower feed conveyor is used to apply a light pressure to the lettuce head so as to maintain the vegetable's orientation as it is conveyed through the system.

In step 504, an image of the lettuce head is captured. In the present embodiment, the upper and lower feed conveyors do not stop as the lettuce head is conveyed past an imaging camera. The system triggers an image capture event when the lettuce head is within the field-of-view of an imaging camera. In one instance, a proximity sensor detects the presence of a flight on the conveyor belt of the lower feed conveyor as the lettuce head passes through the field-of-view of the imaging camera. During an exemplary image capture event, a light source produces a strobe or flash of light to momentarily illuminate the lettuce head. While the lettuce head is illuminated, data from the camera's imaging sensor is acquired and saved. The sensor data is either stored as a software data object, a data array, or image file.

In step 506, the image of the lettuce head is analyzed to determine one or more cutting profiles. The discussion above with respect to FIG. 3 provides a more detailed description of this analysis. The result of the analysis is top-cutting profile to remove a top portion of the lettuce head and a tail-cutting profile to remove a tail portion of the lettuce head. Both cutting profiles are associated with a physical reference point in the system and stored. In one example, the physical reference point is the leading edge of a flight of the lower feed conveyor.

In step 508, the lettuce head is trimmed while being conveyed between a top-cutting mechanism and tail-cutting mechanism. While the lettuce head is conveyed between the cutting mechanisms, the speed of the conveyor is set to a controlled feed rate. A proximity sensor detects a physical reference point in the system (e.g., the leading edge of a conveyor flight). Each cutting mechanism articulates a water knife through an arc based on the cutting profile associated with the lettuce head. As the water knife is articulated through a fixed-radius arc, the lettuce head moves through the stream of cutting fluid at the controlled feed rate. Through the combined motion of the water knife and the lettuce head, the stream of cutting fluid produces variable-radius cutting path through the lettuce head. As trimmed material is cut from the lettuce head, it is separated from the lettuce product feed via, for example, one or more waste chutes located just downstream of the water knife. The trimmed head of lettuce exits the system and is either stored or transported to another location for further processing.

Using the topping and tailing process described above, each lettuce head is trimmed according to its unique size and shape. Because the cutting profile is based on an image of each head being processed, the profile can be optimized to reduce unnecessary waste.

The foregoing descriptions of specific embodiments have been presented for purposes of illustration and description. They are not intended to be exhaustive or to limit the invention to the precise forms disclosed, and it should be understood that many modifications and variations are possible in light of the above teaching.

We claim:

1. A method of trimming a whole lettuce head using a camera-guided trimming system, the lettuce having a top end and a tail end, the method comprising:

conveying the lettuce head disposed between a lower feed conveyor and an upper feed conveyor, the lower feed conveyor having an input end and an output end, the upper feed conveyor disposed a fixed distance over and substantially aligned with the lower feed conveyor;

capturing an image of the lettuce head using a digital imaging system disposed above the lower feed conveyor a fixed distance from the input end of the lower feed conveyor, wherein the digital imaging system is configured to determine a top-cutting profile using the captured image, wherein the digital imaging system is configured to determine a tail-cutting profile using the image; and trimming the top end of the lettuce head using a top-cutting mechanism disposed above the lower feed conveyor between the digital imaging system and the output end of the lower feed conveyor wherein the trimming includes operating a first cutting nozzle while a first armature is being articulated through at least one top-cutting arc, the top-cutting mechanism comprising:
a first servo motor mechanically coupled to a first drive shaft;
the first armature with a pivot end and a sweep end, wherein the sweep end is disposed a radial distance from the pivot end;
the first cutting nozzle configured to trim the lettuce head, wherein the first cutting nozzle is mounted to the sweep end of the first armature; and
servo-control circuitry configured to articulate the first cutting nozzle through the at least one top-cutting arc based on the top-cutting profile; trimming the tail end of the lettuce head using a tail-cutting mechanism disposed over the lower feed conveyor and near the top-cutting mechanism wherein the trimming includes operating a second cutting nozzle while a second armature is being articulated through at least one tail-cutting arc, the tail-cutting mechanism comprising: a second servo motor mechanically coupled to a second drive shaft; the second armature with a pivot end and a sweep end, wherein the sweep end is disposed a radial distance from the pivot end; and the second cutting nozzle to cut the lettuce head, wherein the second cutting nozzle is mounted to the sweep end of the second armature, wherein the servo-control circuitry is configured to articulate the second cutting nozzle through the at least one tail-cutting arc based on the tail-cutting profile.

2. The method of claim 1, further comprising:
conveying the lettuce head under the top-cutting mechanism as the first cutting nozzle is articulated through the at least one top-cutting arc to produce a variable-radius cut across the top end of the lettuce head.

3. The method of claim 2, wherein the variable-radius cut corresponds to the top-cutting profile.

4. The method of claim 1, wherein the digital imaging system determines the top-cutting profile by determining a top-edge profile of the top end of the lettuce head.

5. The method of claim 4, wherein the top-cutting profile is a fixed distance from and follows the top-edge profile.

6. The method of claim 4, wherein the top-cutting profile is a fixed distance from the top-edge profile and the top-cutting profile is a predetermined shape that does not follow the top-edge profile.

7. The method of claim 1, further comprising:
conveying the lettuce head under the tail-cutting mechanism as the second cutting nozzle is articulated through the at least one tail-cutting arc to produce a v-notch cut in the tail end of the lettuce head.

8. The method of claim 1, further comprising:
conveying the lettuce head under the tail-cutting mechanism as the second cutting nozzle is articulated through the at least one tail-cutting arc to produce a straight cut in the tail end of the lettuce head.

* * * * *